United States Patent [19]

Sumida et al.

[11] Patent Number: 5,541,751
[45] Date of Patent: Jul. 30, 1996

[54] LIGHT SCAN TYPE DISPLAY DEVICE HAVING LIGHT WAVEGUIDES AND PHOTO CONDUCTIVE SWITCHING ELEMENTS

[75] Inventors: Yukihiro Sumida, Nara; Yoshihiro Izumi, Kashihara; Sayuri Fujiwara, Nara, all of Japan

[73] Assignee: Sharp Kabushiki Kaisha, Osaka, Japan

[21] Appl. No.: 163,873

[22] Filed: Dec. 8, 1993

[30] Foreign Application Priority Data

Dec. 11, 1992 [JP] Japan .................. 4-331734
Mar. 9, 1993 [JP] Japan .................. 5-047660

[51] Int. Cl.⁶ .............. G02F 1/133; G02F 1/1335
[52] U.S. Cl. .............................. 359/72; 359/40
[58] Field of Search ................... 359/58, 59, 72, 359/40, 41

[56] References Cited

U.S. PATENT DOCUMENTS

| 4,534,622 | 8/1985 | Harada | 359/72 |
|---|---|---|---|
| 4,836,652 | 6/1989 | Oishi | 359/40 |
| 5,009,483 | 4/1991 | Rockwell | 385/2 |
| 5,267,062 | 11/1993 | Bottorf | 359/40 |
| 5,349,453 | 9/1994 | Munakata | 359/40 |

FOREIGN PATENT DOCUMENTS

| 490484 | 6/1992 | European Pat. Off. | 359/72 |
|---|---|---|---|
| 552993 | 7/1993 | European Pat. Off. | 359/72 |
| 7157215 | 9/1982 | Japan | 359/40 |
| 1-173016 | 7/1989 | Japan . | |
| 2-10317 | 1/1990 | Japan . | |
| 0089029 | 3/1990 | Japan | 359/72 |
| 3-214121 | 9/1991 | Japan | 359/40 |
| 4-9922 | 1/1992 | Japan . | |
| 4-116519 | 4/1992 | Japan | 359/40 |
| 4-168424 | 6/1992 | Japan . | |
| 4-175730 | 6/1992 | Japan . | |
| 4-356024 | 12/1992 | Japan . | |
| 5-100246 | 4/1993 | Japan . | |
| 5-313153 | 11/1993 | Japan | 359/40 |

*Primary Examiner*—Anita Pellman Gross
*Assistant Examiner*—Tiep H. Nguyen
*Attorney, Agent, or Firm*—David G. Conlin; Kevin J. Fournier

[57] ABSTRACT

The light scan type display device includes a display medium laid between two opposed substrates, which is driven in response to a light signal. One of the substrates has plural light waveguides provided in parallel and for transmitting a light signal, plural signal electrodes ranged in parallel and orthogonally with the light waveguides and for transmitting a light signal, pixel electrodes formed in a matrix manner, and light switching elements formed of a photoconductive material at crosspoints between the signal electrodes and the light waveguides in a manner to abut on the signal electrodes and the pixel electrodes. Further, the one substrate includes micro lenses for condensing ambient light to pixel openings. The micro lenses serve to condense the light from the backlight onto the pixels for prevent intrusion of any other light except the light scan signal into the switching element.

10 Claims, 9 Drawing Sheets

Fig. 2
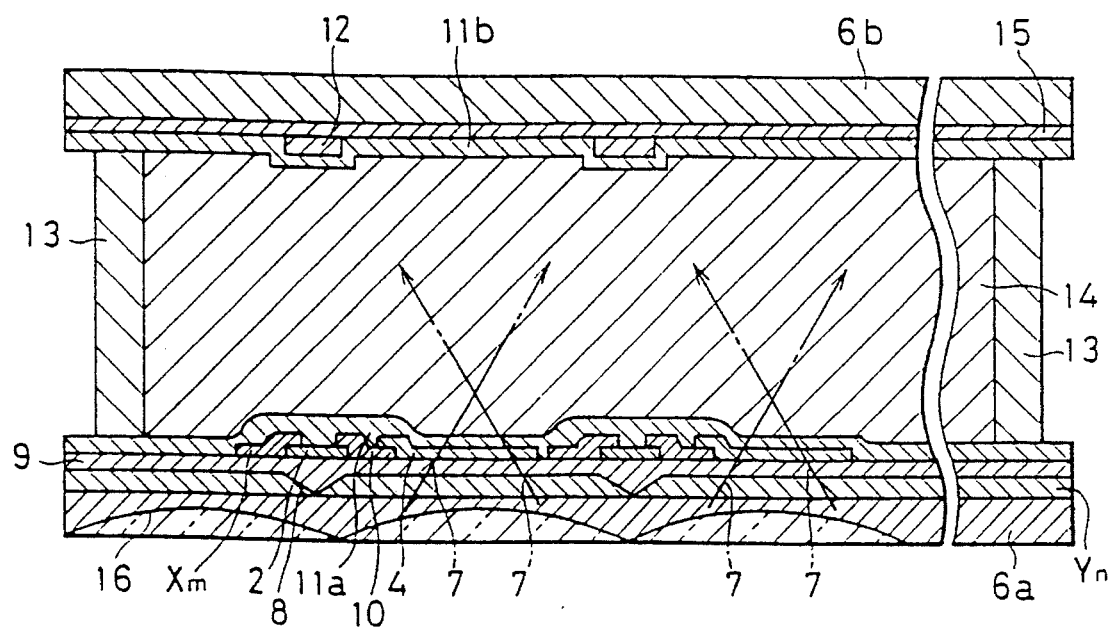

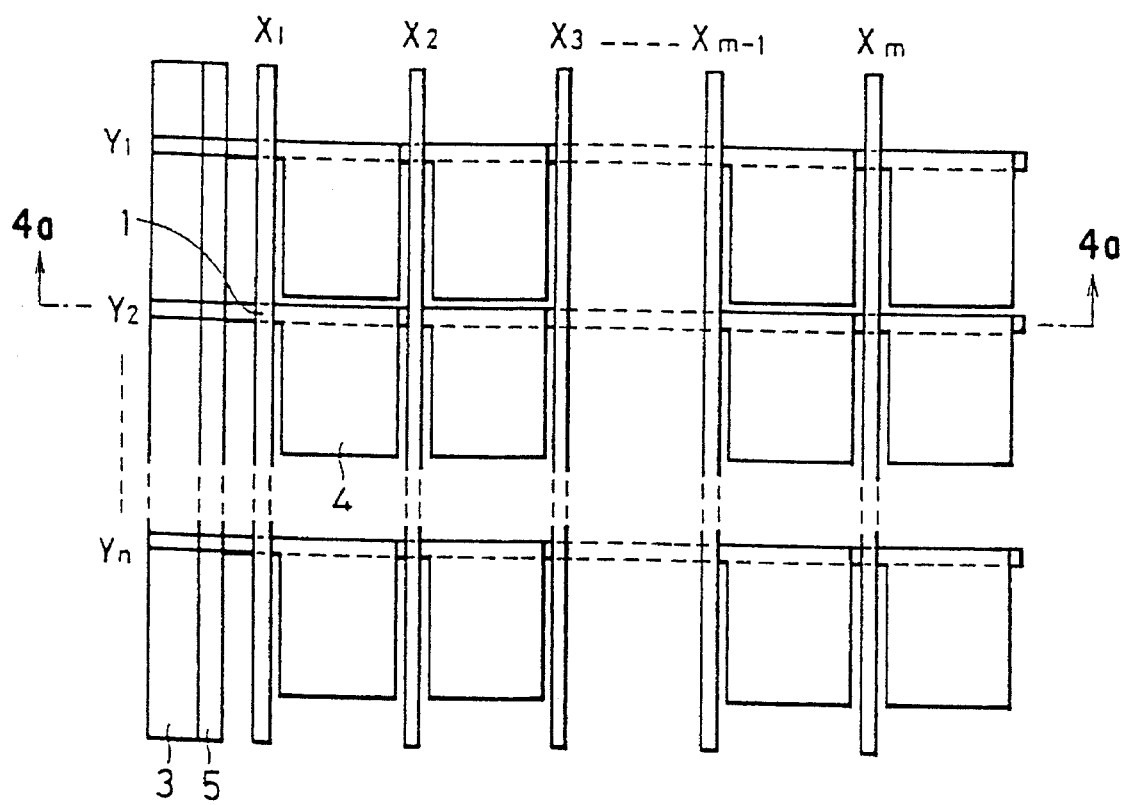

↓ MELT

↓ ABRASION

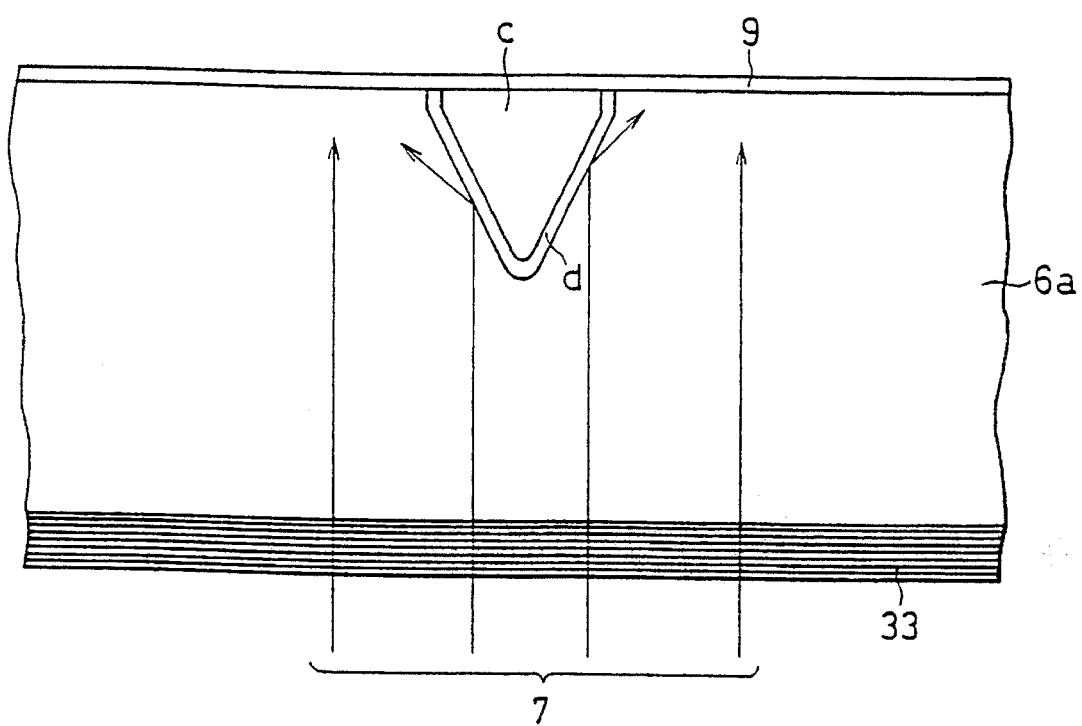

LIGHT SCAN TYPE DISPLAY DEVICE HAVING LIGHT WAVEGUIDES AND PHOTO CONDUCTIVE SWITCHING ELEMENTS

BACKGROUND OF THE INVENTION

1. Field of the Invention

The present invention relates to a light scan type display device, and more particularly to the light scan type display device which may be used in the fields of AV equipment such as a TV or a video game, OA equipment such as a personal computer or a wordprocessor machine, or light information processing elements such as a light modulating element or a light operating element.

2. Description of the Related Art

To transmit a driving signal on electric wiring, in general, the wiring resistance and the floating capacitance have an adverse effect of delaying the signal waveform. In particular, an active-matrix liquid crystal display (LCD) device entails a large wiring resistance of each scan electrode and signal electrode and capacitance at an overlapped part of these electrodes. Such a large wiring resistance and capacitance may have so great an adverse effect on the display that the active-matrix LCD device may not realize a large-type display or a high-definition display. To solve the shortcoming, a light scan type display device for transmitting the driving signal with a ray of light is now being spotlighted.

As a light scan type display, the inventors of the present applicant have proposed a light scan type active-matrix LCD device prior to the present application. The liquid crystal panel provided in the light scan type active-matrix LCD device is arranged to have two substrates. One substrate has plural light waveguides ranged in the Y direction on which plural signal electrodes are ranged in the X direction. At a crosspoint between the light waveguide and the signal electrode, there is provided a switching element made of a photoconductor which is controlled by a light signal transmitted from an array of luminous elements through the light waveguide. The light switching element serves to lower its impedance when light is applied to the element so that the signal electrode may be electrically connected with the pixel electrode. When no light is applied to the element, the light switching element serves to keep its impedance high so that the signal electrode may be electrically insulated from the pixel electrode. The light scan type LCD device is driven by change of impedance of each light switching element based on the light scan signal.

If this display device is applied to a transmission type display device, the device needs to provide a backlight such as a fluorescent lamp. If the display device is applied to a projection type display device, the device needs to provide a projective lamp such as a metal halide lamp. In both the cases, the projected ray may be modified inside of the panel for implementing the image display.

The display device proposed above, however, has a shortcoming that noises caused by the projected light or natural light may be overlapped with the light signal transmitted from the array of the luminous elements unless any means is provided for preventing the projected light or the natural light from being incident to the light waveguide for transmitting a ray of light. As a result, the noises-contained scan signal reaches the switching element. The impure signal may have an adverse effect on a switching characteristic of the light switching element or cause the switching element to malfunction, thereby lowering the quality of the display.

SUMMARY OF THE INVENTION

It is therefore an object of the present invention to provide a light scan type LCD device which is capable of removing the noises caused by the projected light or natural light having an adverse effect on a light switching element, for keeping the display performance and thereby the display quality excellent.

It is another object of the invention to provide a light scan type LCD device which is capable of preventing any other light except a light scan signal from arriving to the switching element by converging a projected ray onto pixel openings.

It is a further object of the present invention to provide a light scan type LCD device which is capable of preventing any other light except a light scan signal from arriving to the switching element by reflecting a projected ray of light on the interface of a light waveguide.

According to a first aspect of the present invention, a light scan type liquid crystal display device includes two substrates having their own electrodes and a display medium laid between the two substrates, one of the substrates having light waveguides for transmitting a light signal, signal electrodes for transmitting an electric signal, light switching elements each formed of a photoconductive material, and a micro lens array for condensing ambient light to pixel openings.

In the light scan type LCD device according to the first aspect of the invention, ambient light such as projected light or natural light having an adverse effect on the light waveguide for transmitting a light signal is condensed on a pixel opening through the effect of a micro lens array and is cut off against the light waveguide. This can prevent intrusion of the noises to the light waveguide. This results in limiting the light signal intruded to the light switching element as the pure light signal transmitted by the luminous element array, thereby improving the switching characteristic and preventing degrade of display performance. Furthermore, since the projected light is condensed only on the pixel electrode, the display enhances its luminance.

According to a second aspect of the present invention, the light scan type LCD device arranged to have two substrates having their own electrodes and a display medium provided between the two substrates, one of the substrates having light waveguides for transmitting a light signal, signal electrodes for transmitting an electric signal, and light switching elements each formed of a photoconductive material, the display medium being driven by the light signal, is characterized in that the plural light waveguides are buried to have such an angle $\alpha$ meeting the relation of $n_1 \sin\alpha > n_2$, wherein $n_1$ denotes an index of refraction of the substrate having the light waveguides buried therein and the angle $\alpha$ denotes an angle formed by the main plane of the substrate and a tangent line of the contacting side of the light waveguide with the substrate.

The light waveguides may be formed in the process of forming plural V-character grooves on the glass substrate, disposing glass fibers in the V-character grooves, and performing the heat treatment on the glass fibers for melting the substrate with the glass fibers.

The substrate having the light waveguides formed thereon may provide a band filter for cutting a predetermined wavelength area of a light signal, in particular, a wavelength area of 600 nm to 2 µm. This band filter may be formed of a multilayered film of dielectric.

In general, when a ray of light enters from a medium of an index of refraction $n_1$ to a medium of an index of refraction $n_2$ at an incident angle $\theta$ (angle formed by the ray and the vertical of the interface), the ray of light meeting the relation of $n_1 \sin\theta > n_2$ is mirror-reflected. This is a principle of propagation of light in the light waveguide (see FIG. 9a). On the other hand, the ray of light meeting the relation of $n_1 \sin\theta < n_2$ is passed through the interface, except the light reflected on the surface (see FIG. 9b).

In the light scan type display device according to the second aspect of the invention, the light waveguides are buried on the glass substrate in a manner to allow the angle a to meet the relation of $n_1 \sin\alpha > n_2$ so that the projected light is mirror-reflected on the interface between the substrate and each of the light waveguides when the projected light from the backlight or the projection lamp enters vertically to the plane of the display device and reaches the light waveguides buried in the substrate. This makes contribution to preventing intrusion of the projected light or the natural light to the light switching element inside of or on the light waveguide so that the pure light signal transmitted by the array of the luminous elements may be entered to the light switching elements. This results in improving the switching characteristic and keeping the display performance.

Further objects and advantages of the present invention will be apparent from the following description of the preferred embodiments of the invention as illustrated in the accompanying drawings.

BRIEF DESCRIPTION OF THE DRAWINGS

FIG. 2 is a schematic sectional view showing an element cut on the line G–G' of FIG. 1;

FIG. 3 is a plane view showing an arrangement of a light scan type active-matrix liquid crystal display device according to a second embodiment of the present invention;

FIG. 7 is a sectional view showing a substrate used in the display device according to the third embodiment of the present invention;

DESCRIPTION OF THE PREFERRED EMBODIMENTS

Hereafter, a preferred embodiment of the present invention will be discussed in detail with reference to the appended drawings.

Figure 1:
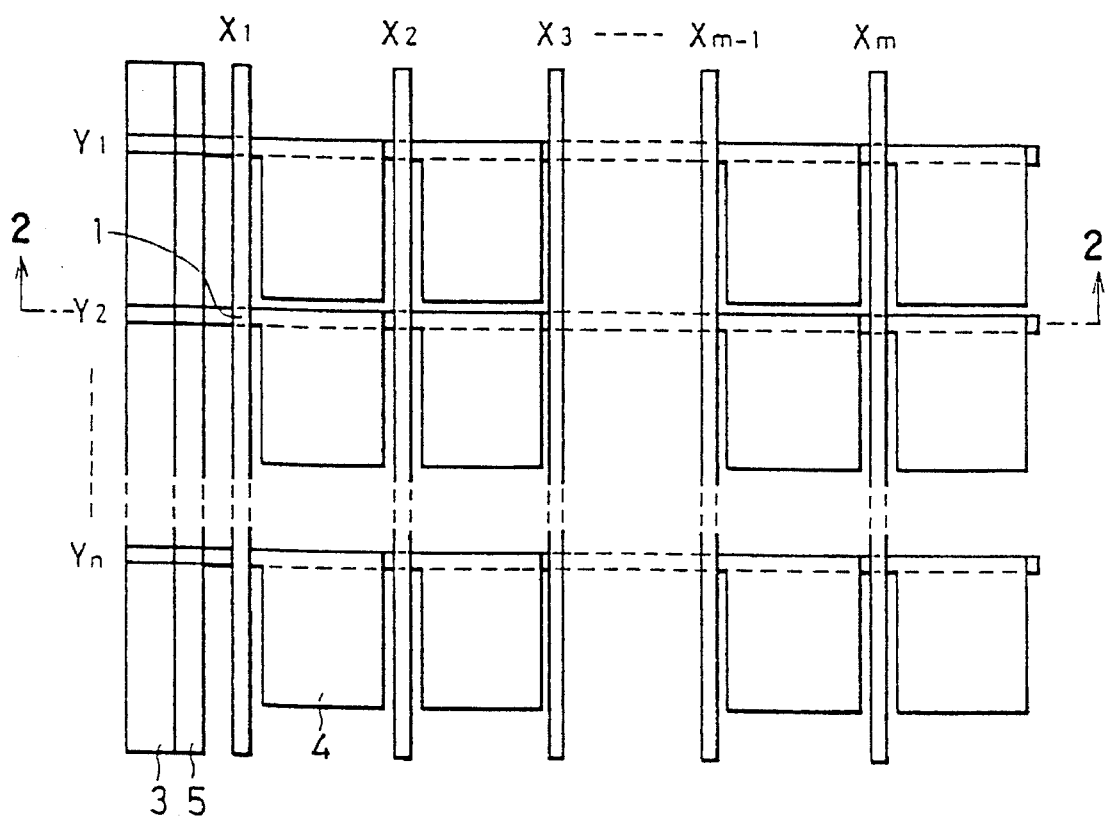
FIG. 1 is a schematic plane view showing an arrangement of a light addressing type active-matrix liquid crystal display device according to a first embodiment of the present invention.

FIG. 1 is a schematic plane view showing an arrangement of an active-matrix liquid crystal display device according to a first embodiment of the present invention. FIG. 2 is a schematic sectional view showing an element cut on the G–G' line of the embodiment shown in FIG. 1.

As shown in FIGS. 1 and 2, on one of the glass substrates composing a liquid crystal display, plural light waveguides $Y_1, Y_2, \ldots, Y_n$ are ranged in the Y direction. On these light waveguides, plural signal electrodes $X_1, X_2, \ldots, X_m$ are ranged in the X direction in a manner to be crossed with the light waveguides, respectively.

The light waveguides $Y_1, Y_2, \ldots, Y_n$ are formed by burring optical fibers on a glass substrate. The end portion of the light waveguide is coupled with a luminous portion made of a luminous array element 3 and a lens array 5.

The signal electrodes $X_1, X_2, \ldots, X_m$ are formed by sputtering a material of Ti. As the signal electrodes $X_1, X_2, \ldots, X_m$, any material like Ta, Cr, Al, or Mo may be used if it meets the conditions about the conductive performance and the process.

Inside of the glass substrate 6a, a micro lens array 16 is provided for preventing projected light (ambient light) from being entered from a lower portion of the element to the light waveguides $Y_1, Y_2, \ldots, Y_n$ formed above and for condensing the projected light onto the pixel electrodes 4. Each micro lens composing the microlens array 16 is a flat convex lens. The micro lens array 16 is formed by diffusing thallium ions to alkali glass through the ion exchanging effect.

At each of the crossing portions 1 between the light waveguides $Y_1, Y_2, \ldots, Y_n$ and the signal electrodes $X_1, X_2, \ldots, X_m$, a light switching element 2 is provided. The light switching element 2 is provided between the signal electrodes $X_m$ and the pixel electrode 4 for driving a display medium like liquid crystal.

On the light waveguide $Y_n$, an $SiO_2$ film is formed as a clad layer 9 by means of a sputtering technique. On the clad layer 9, the signal electrodes $X_1, X_2, \ldots, X_m$ are formed.

On the clad layer 9, the pixel electrode 4 is formed in a matrix manner. Each vertical column of the pixel electrodes is disposed along each signal electrode. Each horizontal row of the pixel electrodes is disposed along each light waveguide. One pixel electrode is disposed in a manner to correspond to a crosspoint between the signal electrode and the light waveguide. The pixel electrode 4 is a transparent and conductive ITO film and is formed by means of the sputtering technique. Under the light switching element 2, a light scattering portion 8 is formed in the light waveguide (core portion) by blemishing the light waveguide so that a light signal may be applied to the light switching element 2.

A hydrogenated amorphous silicon (a-Si:H) film serving as a photoconductive material is formed as the light switching element 2 by means of the plasma CVD technique, nearby each portion crossed between the light waveguides $Y_1, Y_2, \ldots, Y_n$ and the signal electrodes $X_1, X_2, \ldots, X_m$ on the clad layer 9. The a-Si:H film is formed of a silane ($SiH_4$) gas and a hydrogen ($H_2$) gas and the thickness of the film is about 1 μm.

The light switching element 2 abuts on the signal electrode (source electrode) $X_m$ and a drain electrode 10 which are formed of the same material. The drain electrode 10 is connected with the pixel electrode 4.

On the other glass substrates 6b, a cut-off layer 12 is provided for preventing intrusion of light (ambient light) from an upper portion of the element to the light switching element 2 formed on the glass substrate 6a. The cut-off layer 12 is patterned in a manner to be overlapped with the pattern of the light switching element 2.

On both of the substrates 6a and 6b, polyimides 11a and 11b are spin-coated. These polyimides serve as orientation films. The polyimide films formed on the substrates are subject to the rubbing orientation treatment. Both of the substrates 6a and 6b are pasted with a spacer 13 and a liquid crystal 14. As an orientation film, another film may be used such as an organic film like polyamide, various LB films, or obliquely evaporated films of SiO or $SiO_2$.

The light addressing type active-matrix LCD device is formed as mentioned above.

Next, the operating principle will be described. A light scan signal is sequentially guided to the light waveguides $Y_1, Y_2, \ldots, Y_n$ through the lens array 5. The light switching element 2 changes its impedance according to the state of the applied light, that is, bright or dark, so as to control a current flow through the signal electrode (source electrode) $X_m$ and the drain electrode 10 at a horizontal row unit. The control to be done in such a manner allows the liquid crystal to be driven.

In the light-applied state, the light switching element 2 lowers its impedance through the photoelectric effect so that the signal electrode $X_m$ may be electrically connected with the drain electrode 10. The connection makes it possible to apply a data signal to the liquid crystal 14 laid between the pixel electrode 4 and the opposed electrode 15. In the dark state, the light switching element 2 enhances its impedance so that the signal electrode $X_m$ may be electrically insulated from the pixel electrode 4. This insulation stops application of a data signal between the pixel electrode 4 and the opposed electrode 15.

The projected light 7 from the substrate 6a is focused on the pixel electrode 4 through the effect of the micro lens array 18. The projected light 7 is modified by the liquid crystal layer 14 and is outputted as a desired display pattern.

This liquid crystal display device uses a light scan signal. In comparison to the electric signal, the light signal is not adversely effected by the wiring resistance and the floating capacitance. Hence, the signal waveform is not delayed. No delay of the signal waveform makes it possible to realize a large or a high-definition display device.

Further, provision of the micro lens array 16 serves to prevent the projected light 7 from being intruded into the light waveguide Y and projected with the scan signal. This enables to realize a reliable switching operation of the light switching element 2, thereby preventing degrade of the display.

In this embodiment, as a photoconductive material used for forming the light switching element, in addition to the material of a-Si:H, it is possible to use hydrogenated amorphous silicon germanium (a-SiGe:H) against a ray having a near infrared wavelength. The film of a-SiGe:H is formed by the plasma CVD technique with an $SiH_4$ gas and a $GeH_4$ gas.

In general, an LD or LED having a near infrared wavelength (800 nm to 1000 nm band) is relatively cheap, since it is developed for optical communication. Further, a high-output LD or LED is also developed. If such a light source is used as a light source, the light switching element may be composed by using the material of a-$SiGe_x$:H with a high sensitivity against the ray of the near infrared wavelength.

By considering a sensitivity characteristic against a wavelength of the used ray of light, as a photoconductor, another material such as a-$SiC_x$:H, a-$SiN_x$:H, a-$SiO_x$:H, a-$SiSn_x$:H, and a-$SiO_xN_y$:H may be used.

Further, the light switching element may employ a semiconductor diode structure type having a photoconductive characteristic such as a PIN type, a Schottky type, a MIS (Metal-Insulator-Semiconductor) type or a back-to-back diode structure having two diodes connected in series and in opposite, or a diode-ring structure having two diodes connected in parallel and in opposite.

As a light waveguide, in addition to an ion-diffused glass waveguide, any one such as a quartz system light waveguide composed by a flame hydrolysis deposition technique or the CVD technique, a light waveguide made of a polymer material, a quartz fiber, or a plastic fiber may be used if it meets the conditions about the photoconductive and the process. In the case of using the fibers, in place of the clad layer indicated in this embodiment, the clad existing in the fiber itself may be used.

Further, in this embodiment, the liquid crystal layer uses a TN (Twisted Nematic) mode as a display mode. The used liquid crystal is a fluorocarbon liquid crystal ZLI4792 manufactured by the MERCK company. As the liquid crystal display mode, it is possible to use a guest host mode, an ECB (Electrically Controlled Birefringence) mode, an STN (Supper Twisted Nematic) mode, or a phase transfer mode if nematic liquid crystal may apply to the liquid crystal layer. Moreover, it is also possible to use an SSFLC (Surface Stabilized Ferroelectric Liquid Crystal) mode if chiral smectic liquid crystal is applied to the liquid crystal layer or a PDLC (Polymer Dispersed Liquid Crystal) mode if a compound film composed of a high molecular material and liquid crystal is applied to the layer.

As noted above, according to this embodiment, the micro lens array 16 is provided for cutting off the projected light having an adverse effect on the light waveguide for transmitting a light signal. The micro lens array 16 serves to converge the projected light onto only the pixel electrode so as to prevent the noises resulting from the projected light intruded to the light waveguide. As a result, the pure light signal transmitted by the luminous element array is entered to the light switching element. This results in improving the switching characteristic and preventing degrade of the display performance. Further, the projected light converges only on the pixel electrode. This makes great contribution to enhancing the display performance.

Next, the description will be oriented to the second embodiment of the present invention.

Figure 4A:
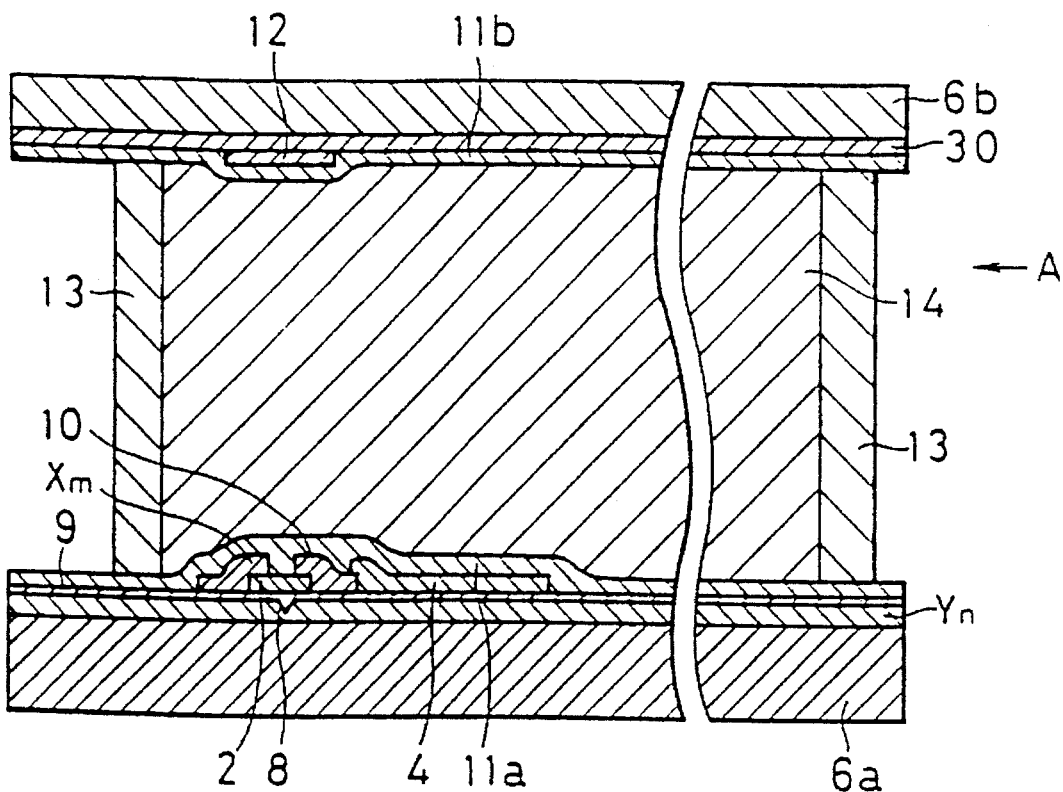
FIG. 4a is a schematic sectional view showing an element cut on the line G–G' of FIG. 3.

FIG. 3 is a plane view showing an arrangement of a light scan type active-matrix liquid crystal display device according to the second embodiment of the present invention. FIG. 4a is a sectional view showing the structure of the element cut on the G–G' line. The same components of this embodiment as those of the first embodiment shown in FIGS. 1 and 2 have the same reference numbers.

On one 6a of the glass substrates composing the liquid crystal panel, plural light waveguides $Y_1, Y_2, \ldots, Y_n$ are ranged in the Y direction. On those light waveguides, plural signal electrodes $X_1, X_2, \ldots, X_m$ are ranged in the X direction and in a manner to be crossed with the plural waveguides $Y_1, Y_2, \ldots, Y_n$, respectively.

The light waveguides $Y_1, Y_2, \ldots, Y_n$ are formed by burying optical fibers in the glass substrate 6a. The sectional form of the fiber is selected so that the projected light 7 from the substrate 6a may be mirror-reflected on the interface.

Each end of the light waveguides $Y_1, Y_2, \ldots, Y_n$ is coupled with a luminous portion composed of the luminous element array 3 and the micro lens array 5. In this embodiment, the luminous element array 3 uses a high-output LD array. If it is not necessary, an LED array may be used.

The signal electrodes $X_1, X_2, \ldots, X_m$ are formed by sputtering Ti. As the signal electrodes, any material such as Ta, Cr, Al or Mo may be used only if it meets the conditions about the conductive performance and the process.

At each of the crosspoints 1 between the light waveguides $Y_1, Y_2, \ldots, Y_n$ and the signal electrodes $X_1, X_2, \ldots, X_m$, the light switching element 2 is provided. This light switching element 2 is laid between each of the signal electrodes $X_1, X_2, \ldots, X_m$ and each pixel electrode 4 for driving a display medium such as liquid crystal.

On the light waveguides $Y_n$, an $SiO_2$ film is formed as a clad layer 9 by means of the sputtering technique.

On the clad layer 9, the pixel electrodes 4 are ranged in a matrix manner. Each vertical column of the pixel electrodes is ranged along each signal electrode. Each horizontal row is ranged along each light waveguide. One pixel electrode is disposed in a manner to correspond to each crosspoint between the signal electrode and the light waveguide. The pixel electrode 4 is made of a transparent and conductive ITO film and is formed by the sputtering technique. On each of the light waveguides $Y_1, Y_2, \ldots, Y_n$ at the portions thereof under each light switching element 2, a light scattering portion 8 is provided for efficiently guiding a ray of light from the light waveguide $Y_n$ to the light switching element 2.

As the light switching element 2, a hydrogenated amorphous silicon (a-Si:H) film is formed by means of the plasma CVD technique. The a-Si:H film is provided nearby each of the crossed portions between the light waveguides $Y_1, Y_2, \ldots, Y_n$ and the signal electrodes $X_1, X_2, \ldots, X_m$. The a-Si:H film is formed of silane ($SiH_4$) gas and hydrogen ($H_2$) gas. The thickness of the film is about 1 μm.

The light switching element 2 abuts on the signal electrode (source electrode) $X_m$ and a drain electrode 10. These components are formed of the same material. The drain electrode 10 is connected to the pixel electrode 4.

On the other substrate 6b, an ITO film is formed as a transparent electrode (opposed electrode) 30 by means of the sputtering technique.

On the glass substrate 6b, a cut-off layer 12 is formed for preventing intrusion of light (ambient light) from the upper portion of the element to the light switching element 2. The cut-off layer 12 is patterned in the same manner as the light switching element 2.

On both of the substrates 6a and 6b, polyimides 11a and 11b are spin-coated. These polyimides serve as orientation films. The polyimide films formed on the substrates are subject to the rubbing orientation treatment. Both of the substrates 6a and 6b are pasted with a spacer 13 and a liquid crystal 14. As an orientation film, another film may be used such as an organic film like polyamide, various LB films, or obliquely evaporated films of SiO or $SiO_2$.

Figure 4B:
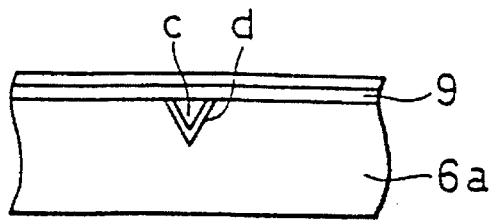
FIG. 4b a sectional view showing a light waveguide Y viewed from a direction of an arrow A shown in FIG. B.
Figure 5A:
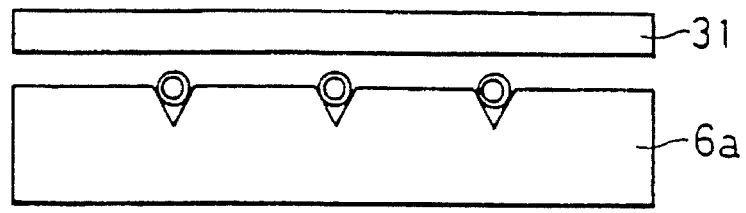
FIG. 5 is a view showing a method for producing a light waveguide used in the display device according to the second embodiment of the present invention.
Figure 5B:
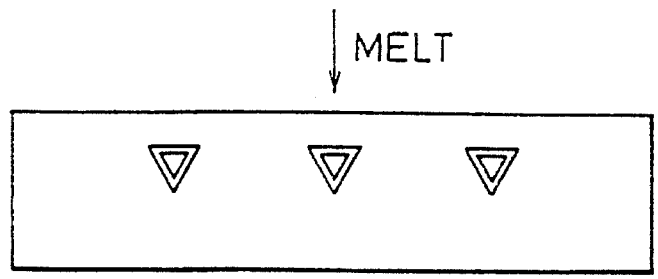
Figure 5C:
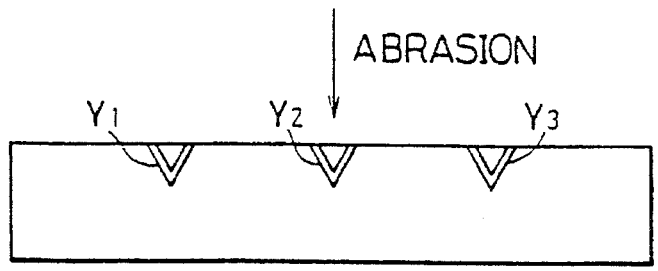
Figure 5D:
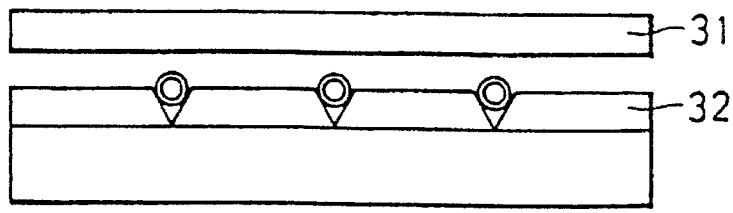

FIG. 4b is a sectional view showing the light waveguide $Y_n$ as viewed from the A direction of FIG. 4a. The light waveguide is composed of a core portion c and a clad portion d.

The light scan type active-matrix LCD device according to this embodiment is described as discussed above.

Next, the operating principle will be discussed below. The light scan signal is sequentially guided from the luminous element array 3 to the light waveguides $Y_1, Y_2, \ldots, Y_n$ through the micro lens array 5. The light switching element 3 changes its impedance according to the state of the light applied thereto, that is, the bright or the dark state. The change of the impedance makes it possible to control the flow of current in the signal electrodes (source electrodes) $X_1, X_2, \ldots, X_m$ and the drain electrode 10 so as to drive the liquid crystal.

In the light-applied state, the light switching element 2 lowers the impedance through the photoconductive effect so that the signal electrode (source electrode) $X_m$ may be electrically connected to the drain electrode 10. As a result, a data signal is applied to the liquid crystal 14 laid between the pixel electrode 4 and the opposed electrode 30. In the dark state, the light switching element 2 enhances its impedance so that the signal electrode (source electrode) $X_m$ may be electrically insulated from the drain electrode 10. As a result, no data signal is applied between the pixel electrode 4 and the opposed electrode 30.

The projected light 7 entered from the substrate 6a is modified through the effect of the liquid crystal layer 14 and is outputted as a desired display pattern. In this case, the projected light 7 is mirror-reflected on the interface between the substrate 6a and the light waveguide $Y_n$ and is inhibited to be intruded into the light waveguide $Y_n$.

This display device uses a light scan signal. As compared with the electric signal, the display device is not so much adversely effected by the wiring resistance and the floating capacitance, thereby bringing about no delay of the signal waveform. Hence, this display device may be used for realizing a large-screen or a high-definition display.

FIG. 5 shows a method for manufacturing the light waveguides $Y_1, Y_2, \ldots, Y_n$ used in the display device according to this embodiment.

At first, the glass substrate 6a is prepared. On the substrate 6a, V-character grooves are formed at the locations where the light waveguides $Y_1, Y_2, \ldots, Y_n$ are ranged. To form the grooves, a dicing machine is the most approximate utensil, because it may accurately adjust the angle of the V-character groove. Next, a glass fiber made of a core portion and a clad portion is ranged in the V-character groove. Then, a glass fiber is laid between the glass substrate 6a and a glass substrate 31 made of the same material (see the step shown in (a) of FIG. 5). Next, both of the substrates 6a and 31 are subject to thermal treatment as the pressure is being applied to these substrates so that the substrates 6a and 31 and the glass fiber are melt with one another (see the step shown in (b) of FIG. 5). Further, from the melt component, only the substrate 31 is removed by the abrasion (see the step shown in (c) of FIG. 5).

In the step of (a), as means for forming the glass substrate 6a in the V groove, in place of the step of (a), it is possible to employ the method of disposing on the glass substrate 6a the glass substrate 32 whose end is obliquely cut (see the step (d) of FIG. 5).

Figure 6A:
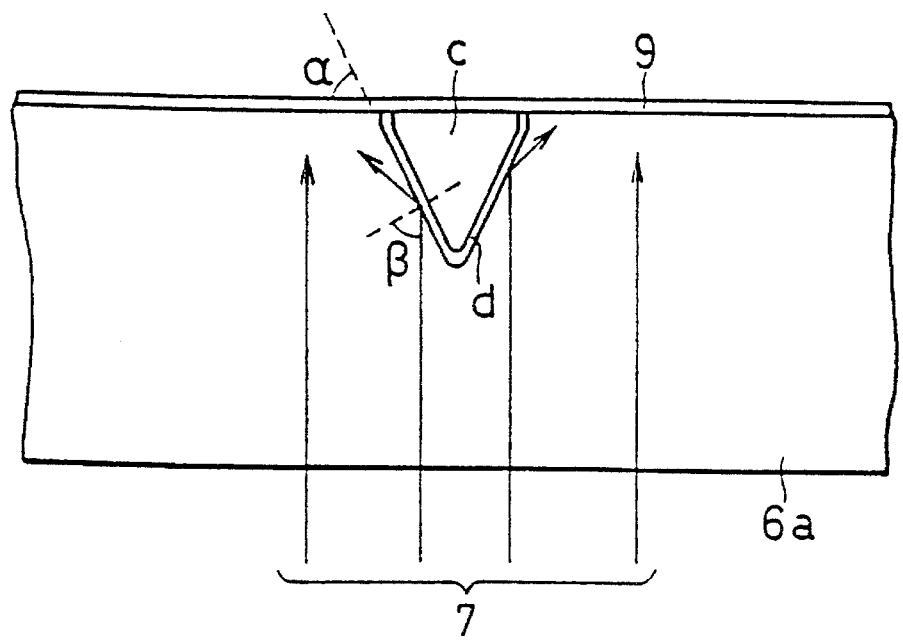
FIG. 6a is a sectional view showing a sectional form of the light waveguide Y of the display device according to the second embodiment of the present invention.

FIG. 6a shows the detail of the sectional form of the light waveguide $Y_n$ formed by the above method. The light waveguide $Y_n$ is buried in a manner to keep an angle of a between the tangent line of the contacting side with the substrate and the surface of the substrate. The projected light 7 of the backlight or the metal halide lamp is intruded into the substrate and reaches the light waveguide $Y_n$, when the projected light 7 enters into the interface between the light waveguide $Y_n$ and the substrate 6a at an angle of incidence $\beta$ as shown in FIG. 6a.

Figure 6B:
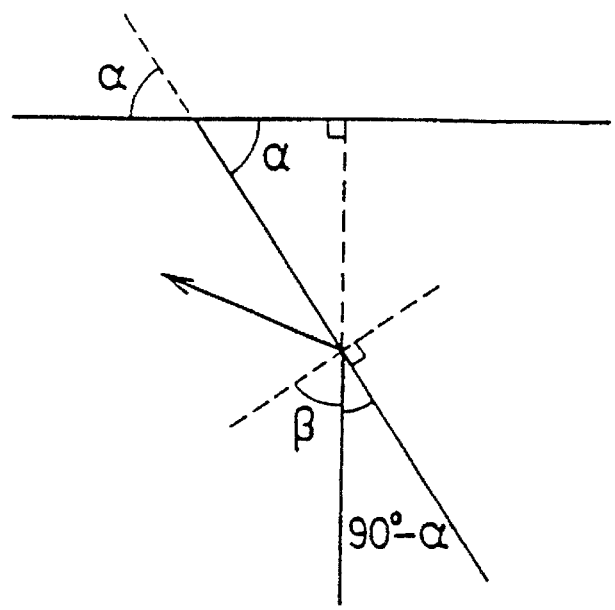
FIG. 6b is a schematic diagram showing a relation of a burying angle $\alpha$ of the light waveguide with an incident angle $\beta$ of the projected light to the light waveguide.

FIG. 6b shows a relation between $\alpha$ and $\beta$. As is obvious from FIG. 6b, the relation of $\alpha=\beta$ is established. If the relation among the index of refraction $n_2$ of the clad portion d formed in the light waveguide $Y_n$, the index of refraction $n_1$ of the substrate 6a having the light waveguide $Y_n$ buried therein, and an angle a formed by the surface of the substrate 6a and the tangent line of the side of the light waveguide $Y_n$ on which the light waveguide $Y_n$ is contacted with the substrate meets the expression 1 of $$n_1 \sin\alpha > n_2 \qquad (1)$$

the projected light 7 is miFror-reflected on the interface. For example, the glass material used in this embodiment has a characteristic that the index of refraction $n_1$ of the substrate 6a is 1.65 and the index of refraction $n_2$ of the clad portion d of the light waveguide $Y_n$ is 1.52. Hence, by setting to 70 an angel a formed by the surface of the substrate and the tangent line of the contacting side of the light waveguide $Y_n$ with the substrate, it is possible to reduce the amount of the projected light 7 intruded to the light waveguide $Y_n$. As a result, the pure light signal transmitted by the luminous element array 3 is applied to the light switching element 2.

In combination with the form of the light waveguide $Y_n$ indicated in this embodiment, a light cut-off film may be formed inside of the substrate and below the switching element, on the substrate or the interface of the light waveguide $Y_n$, for enhancing the reliability of the light cut-off performance. In this case, the manufacturing process is made complicated. Hence, it is necessary to consider the requested light cut-off performance.

In this embodiment, as a photoconductive material for forming the light switching element 2, in addition to the material of a-Si:H, the material of hydrogenated amorphous silicon germanium (a-SiGe:H) may be used against a ray of a near infrared wavelength. The a-SiGe:H film is formed by means of the plasma CVD technique with the $SiH_4$ gas and the $GeH_4$ gas.

In general, the LD or the LED having a near infrared wavelength output (in the band of 800 nm to 1000 nm) has been developed for optical communication and thus is relatively cheap. Further, a high-output LD or LED is also developed. If such a light source is used as a light source, the light switching element may be composed by using the material of a-SiGe$_x$:H with a high sensitivity against the ray of the near infrared wavelength. By considering a sensitivity characteristic against a wavelength of the used ray of light, as a photoconductor, another material such as a-SiC$_x$:H, a-SiN$_x$:H, a-SiSn$_x$:H, and a-SiO$_x$N$_y$:H may be used. Moreover, the light switching element may employ a semiconductor diode structure type having a photoconductive characteristic such as a PIN type, a Schottky type, a MIS (Metal-Insulator-Semiconductor) type or a back-to-back diode structure having two diodes connected in series and in opposite, or a diode-ring structure having two diodes connected in parallel and in opposite.

Further, in this embodiment, the liquid crystal layer uses a TN (Twisted Nematic) mode as a display mode. The used liquid crystal is a fluorocarbon liquid crystal ZLI4792 manufactured by the MERCK company. As the liquid crystal display mode, it is possible to use a guest host mode, an ECB (Electrically Controlled Birefringence) mode, an STN (Supper Twisted Nematic) mode, or a phase transfer mode if nematic liquid crystal may apply to the liquid crystal layer. Moreover, it is also possible to use an SSFLC (Surface Stabilized Ferroelectric Liquid Crystal) mode if chiral smectic liquid crystal is applied to the liquid crystal layer or a PDLC (Polymer Dispersed Liquid Crystal) mode if a compound film composed of a high molecular material and liquid crystal is applied to the layer.

Moreover, this embodiment has been described about the LCD device using liquid crystal as a display medium. This embodiment may offer the similar effect to another display device such as an electro-chromic display device, and an electricphoretic display device and the like.

Next, the description will be oriented to a third embodiment of the present invention.

As compared with the display device indicated in the second embodiment, as a method for reducing the intruded amount of projected light 7 into the light waveguides $Y_1, Y_2, \ldots, Y_n$, a filter composed of a dielectric multilayered film may be provided outside of the substrate 6a (opposite surface of the side where the light waveguide $Y_n$ is provided).

FIG. 7 is a sectional view showing the substrate 6a used in the third embodiment. The arrangements of the substrate 8a and the light waveguide $Y_n$ are the same as those indicated in the first embodiment, except that a filter 33 made of a dielectric multilayered film is provided outside of the substrate 6a. This filter 33 is made of a laminated multilayered film of $SiO_2$ and $TiO_2$ and is formed by the electron beam (EB) deposition technique.

Figure 8:
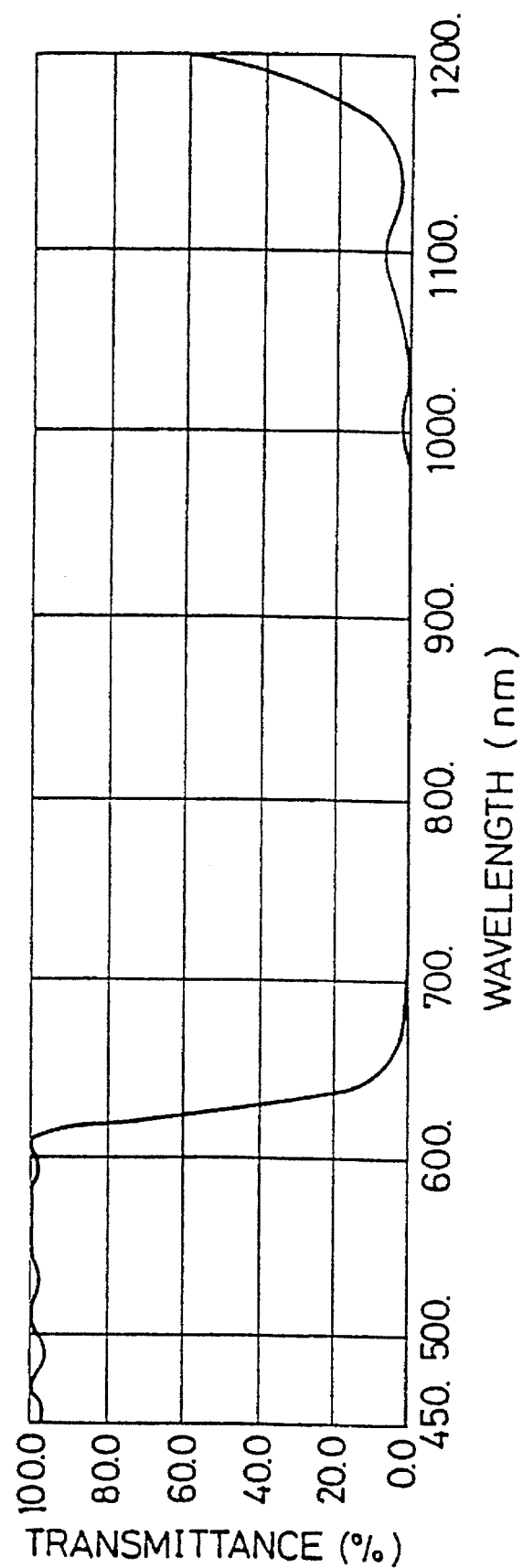
FIG. 8 is a graph showing a wavelength characteristic of a transmission factor of a filter used in the display device according to the third embodiment of the present invention.
Figure 9A:
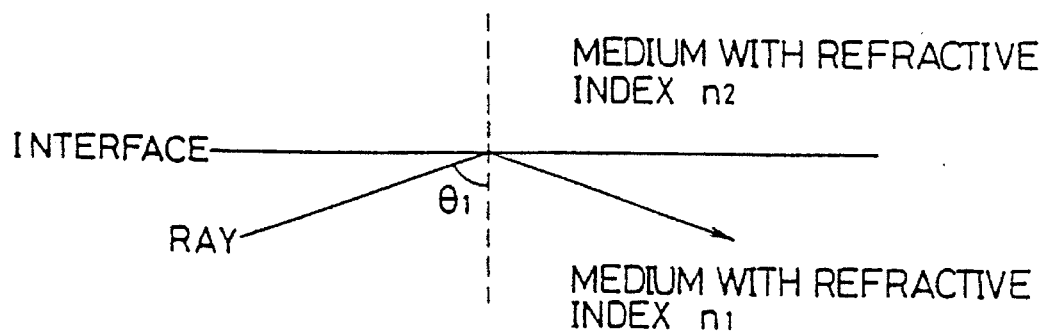
FIGS. 9a and 9b are model views exemplarily showing a principle of propagation of light in the light waveguide.
Figure 9B:
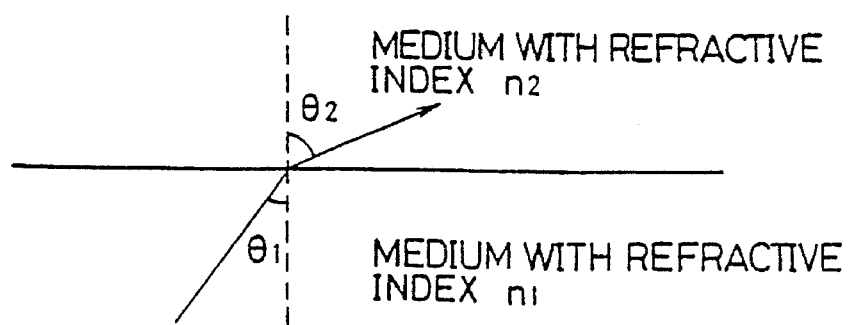

FIG. 8 shows a wavelength characteristic of a transmission ratio of the filter 83. The filter 83 does not substantially pass the light in the wavelength range of 800 to 1000 nm. Further, the light switching element uses the material of a-Si$_{1-x}$Ge$_x$:H which is excellent in a sensitivity characteristic against the light having a wavelength of 800 to 900 nm. As the luminous element array, an AlGaAs system double hereto junction type LD may be used. The luminous wavelength of the LD is 850 nm. This type of LD has been developed as a high output LD for optical communication.

In the display device according to this embodiment, when the projected light 7 enters into the substrate 6a, at first, the filter 33 serves to cut the light having the wavelength ranging from 600 to 1000 nm. The remaining light passed through the filter 33 is mirror-reflected on the light waveguide $Y_n$ and the substrate 6a, like the effect of the display device indicated in the embodiment 1, thereby reducing the projected light 7 intruded in the light waveguide $Y_n$. If a slight amount of projected light 7 is intruded in the light waveguide $Y_n$, the light passed through the filter 33 does not contain the light having a wavelength range in which the light switching element 2 is excellent in sensitivity. This results in reducing the adverse effect onto the switching characteristic to a minimum.

In the second and third embodiments, by reducing the noise signal of the projected light having an adverse effect on the characteristics of the light switching element or the projected light intruded into the light waveguide, it is possible to prevent degrade of the display performance and provide a high-quality display device.

Many widely different embodiments of the present invention may be constructed without departing from the spirit and scope of the present invention. It should be understood that the present invention is not limited to the specific embodiments described in the specification, except as defined in the appended claims.

What is claimed is:

1. A light scan type display device having a display medium laid between two opposed substrates, said display medium being driven by a light signal, one of said substrates comprising:

plural light waveguides arranged in parallel and for transmitting said signal, each of said light waveguide being formed of a core portion and a clad portion around said core portion;

plural signal electrodes arranged in parallel and orthogonally with said plural light waveguides and for transmitting an electric signal;

plural pixel electrodes formed in a matrix manner; and light switching elements formed of a photoconductive material at crosspoints between said signal electrodes and light waveguides in a manner to contact with said signal electrodes and said pixel electrodes;

each of said light waveguides being buried in said one substrate in a manner to keep such an angle $\alpha$ as meeting the relation of $n_1 \sin \alpha > n_2$ wherein an index of refraction of said clad portion is $n_2$ an index of refraction of said one substrate is $n_1$ and an angle formed by the main surface of said substrate and a tangent line of the contacting side of the light waveguide with said substrate is $\alpha$.

2. A display device as claimed in claim 1, wherein each of said light waveguides is triangular in section.

3. A display device as claimed in claim 2, wherein each of said light waveguides is formed by forming a V groove in a glass substrate, putting a glass fiber, and performing post-heat treatment with respect to said glass fiber for melting said substrate with said glass fiber.

4. A display device as claimed in claim 1, wherein a band filter for cutting a wavelength area of said light signal is provided in said one substrate.

5. A display device as claimed in claim 4, wherein said band filter is formed of a dielectric multilayered film.

6. A display device as claimed in claim 1, wherein said display medium is liquid crystal.

7. A display device as claimed in claim 1, wherein the other substrate includes an opposed electrode on the overall surface thereof.

8. A display device as claimed in claim 1, wherein the other substrate includes a light cut-off layer at the location corresponding to said light switching element.

9. A display device as claimed in claim 1, wherein each of said light switching elements contacts with each of said pixel electrodes through a drain electrode.

10. A display device as claimed in claim 1, wherein a light scattering portion is formed at the location corresponding to each said light switching elements of each of said light waveguides.

* * * * *